(12) United States Patent
Wang (10) Patent No.: US 12,478,933 B2
(45) Date of Patent: Nov. 25, 2025

(54) MIXING DEVICE WITH ROTATABLE CONTAINER

(71) Applicant: Shanghai Champion Technology CO., LTD., Shanghai (CN)

(72) Inventor: Menggang Wang, Shanghai (CN)

( * ) Notice: Subject to any disclaimer, the term of this patent is extended or adjusted under 35 U.S.C. 154(b) by 0 days.

(21) Appl. No.: 18/934,171

(22) Filed: Oct. 31, 2024

(65) Prior Publication Data

US 2025/0345760 A1 Nov. 13, 2025

(30) Foreign Application Priority Data

May 13, 2024 (CN) .......................... 202410586898.9

(51) Int. Cl.
| | |
|---|---|
| *B01F 29/83* | (2022.01) |
| *B01F 35/32* | (2022.01) |
| *B01F 35/33* | (2022.01) |
| *B01F 35/45* | (2022.01) |
| *B01F 35/75* | (2022.01) |
| *B01F 35/30* | (2022.01) |

(52) U.S. Cl.
CPC .......... *B01F 29/83* (2022.01); *B01F 35/3204* (2022.01); *B01F 35/3212* (2022.01); *B01F 35/3214* (2022.01); *B01F 35/323* (2022.01); *B01F 35/33* (2022.01); *B01F 35/453* (2022.01); *B01F 35/754251* (2022.01); *B01F 2035/351* (2022.01); *B01F 2035/352* (2022.01)

(58) Field of Classification Search
CPC ................................ B01F 29/83; B01F 29/90
USPC ................................................. 366/221–224
See application file for complete search history.

(56) References Cited

U.S. PATENT DOCUMENTS

| | | | | |
|---|---|---|---|---|
| 348,931 | A | * 9/1886 | Ross ..................... | B01F 27/806 |
| | | | | 366/605 |
| 1,042,929 | A | * 10/1912 | Lanaux ..................... | B02B 3/00 |
| | | | | 99/626 |
| 2,115,742 | A | * 5/1938 | Newton .................. | B01F 27/95 |
| | | | | 475/11 |

(Continued)

FOREIGN PATENT DOCUMENTS

| | | |
|---|---|---|
| CN | 111821888 A | 10/2020 |
| CN | 111867712 A | 10/2020 |

(Continued)

*Primary Examiner* — David L Sorkin
(74) *Attorney, Agent, or Firm* — Novoclaims Patent Services LLC; Mei Lin Wong (57) ABSTRACT

A mixing device with rotatable container, which can simultaneously meet the sealing, material mixing and cleaning requirements of large-sized mixers, includes a fixed container having a top opening; a mixing container having a top opening and a bottom material outlet, rotatably connected to and positioned inside the fixed container; a driving cover configured to open or close the top opening of the fixed container; a mixing container cover integrally and coaxially arranged with the driving cover and to rotate relative to the driving cover, configured to open or close the top opening of the mixing container and to rotate synchronously with the mixing container after the mixing container is covered by the mixing container cover; and a discharge and sealing mechanism arranged coaxially with the driving cover to form an integral body, and configured to open or close the material outlet from inside.

7 Claims, 6 Drawing Sheets

(56) References Cited

U.S. PATENT DOCUMENTS

| | | | | |
|---|---|---|---|---|
| 2,592,334 A * | 4/1952 | Reiffen | ................... | B01F 29/83 |
| | | | | 241/222 |
| 2,651,581 A * | 9/1953 | Courtney | ................ | C08B 1/006 |
| | | | | 106/167.01 |
| 3,420,507 A * | 1/1969 | Eirich | ................... | B01F 29/835 |
| | | | | 366/221 |
| 4,854,715 A * | 8/1989 | Eirich | ..................... | B01F 29/83 |
| | | | | 366/94 |
| 2011/0249527 A1* | 10/2011 | Seiler | ..................... | B01F 29/83 |
| | | | | 366/222 |
| 2013/0016581 A1* | 1/2013 | Doerr | ..................... | B65D 88/68 |
| | | | | 366/349 |
| 2021/0008516 A1* | 1/2021 | Günther | ................... | B01F 29/83 |
| 2021/0023519 A1* | 1/2021 | Blau | ................... | B01F 35/7547 |
| 2021/0094007 A1* | 4/2021 | Seiler | ................... | F16J 15/3456 |
| 2021/0245122 A1* | 8/2021 | Blau | ..................... | B01F 35/452 |

FOREIGN PATENT DOCUMENTS

| | | |
|---|---|---|
| CN | 111902204 A | 11/2020 |
| DE | 102019108869 A1 | 10/2020 |

\* cited by examiner

MIXING DEVICE WITH ROTATABLE CONTAINER

CROSS REFERENCE OF RELATED APPLICATION

This is a non-provisional application that claims priority to Chinese application number 2024105868989, filing date May 13, 2024, the entire contents of each of which are expressly incorporated herein by reference.

BACKGROUND OF THE PRESENT INVENTION

Field of Invention

The present invention relates to a mixing device, in particularly related to a mixing device with rotatable container.

Description of Related Arts

In general, a mixer has the basic function of mixing and dispersing materials. Most of the existing rotary mixers or mixing devices have a container cover that does not need to rotate together with the mixer, and a sealing element is arranged between the mixer and the cover while relative rotation is achieved through friction. The sealing element can be easily replaced, but the sealing performance is poor, especially for large-sized mixers, and it is difficult to meet production conditions. In addition, the materials inside the existing rotary mixers or mixing devices are usually discharged by using discharge tools external to the mixer, and all the discharge tools are arranged on the discharge path, therefore this type of discharge tools are difficult to fulfill cleaning or washing requirements.

SUMMARY OF THE PRESENT INVENTION

In order to solve the above problems and to simultaneously meet the requirements of sealing, material mixing and cleaning of large-sized mixers, the present invention provides a mixing device with rotatable container, comprising:
 a fixed container, having a top opening and defining a receiving cavity;
 a mixing container having a top opening and defining a mixing cavity received inside the fixed container, rotatably connected to the fixed container and having a material outlet in a bottom portion of the mixing container;
 a discharge and sealing mechanism, which comprises a piston arranged to open or close the material outlet;
 a driving cover configured to be driven to open or close the top opening of the fixed container;
 a mixing container cover coaxially arranged with the driving cover and to rotate relatively to the driving cover, forming an integral body with the driving cover, the mixing container cover is configured to be driven to open or close the top opening of the mixing container and to rotate synchronously with the mixing container after the mixing container is covered by the mixing container cover; and
 the piston is arranged inside the mixing container and coaxially with the driving cover to form an integral body, the piston is configured to be driven to move linearly relative to the driving cover, after the piston closes the material outlet, the piston is configured to rotate synchronously with the mixing container when the mixing container is driven to rotational movement.

Preferably, a linear motion mechanism comprising a fixed part and a moveable part is provide to control the driving cover to be driven to open or close the fixed container, the fixed container is installed on the fixed part of the linear motion mechanism and the driving cover is installed on the moveable part of the linear motion mechanism.

Preferably, a slewing support bearing is arranged between the driving cover and the mixing container cover.

Preferably, a hollow slewing bearing is arranged between an outer bottom side of the mixing container and an inner bottom side of the fixed container.

Preferably, a power mechanism is provided to control a rotational movement of the mixing container relative to the fixed container, wherein the power mechanism comprises a reduction motor mounted on an outer bottom surface of the fixed container, an inner gear ring mounted on an outer bottom surface of the mixing container and a gear mounted on an output shaft of the reduction motor and meshed with the inner gear ring.

Preferably, the discharge and sealing mechanism further comprises a linear drive mechanism, a driving rod, a second sealing member and a fifth sealing member. The driving rod is sleeved inside a hollow driving shaft, and the driving rod is controlled by the linear driving mechanism installed on the driving cover to realize linear movement, the fifth sealing member is arranged between the driving rod and the hollow driving shaft, the hollow driving shaft is provided on the driving cover and the mixing container cover, the piston is mounted at a lower end of the driving rod, the piston is capable of having rotational movement relative to the driving rod, and the second sealing member is provided between an outer side surface of the piston and a material outlet side surface of the material outlet.

Preferably, a hollow shaft reduction motor is mounted on the driving cover; a hollow driving shaft installed inside the hollow shaft reduction motor; a main commutator gear housing is mounted below the driving cover and is in sealed contact with the mixing container cover; the hollow driving shaft is arranged on the driving cover and the main commutator gear housing, and is capable of having rotational movement relative to the driving cover and the main commutator gear housing, an auxiliary commutator gear housing is connected to the main commutator gear housing through a horizontal drive arm; a mixer center shaft is installed on the auxiliary commutator gear housing; and a mixing rotor is mounted on the mixer center shaft.

Furthermore, a scraper is mounted on the main commutator gear housing, wherein the scraper is clearance fit with both a side wall and a bottom of the mixing container at the same time, a vertical outer edge of the scraper forms a non-contact clearance fit with a side wall of the mixing container, an outer edge of the bottom side of the scraper is clearance fit with the upper plane of the bottom side of the mixing container, and the scraper is spaced apart from the mixing rotor.

Furthermore, a hollow driving shaft is mounted at upper and lower sides of the main commutator gear housing through bearings, a pair of fan gears are arranged inside the main commutator gear housing, and are mounted to the hollow drive shaft vertically at 90 degrees; another pair of fan gears are connected vertically at 90 degrees arranged inside the auxiliary commutator gear housing; a horizontal driving arm having two ends respectively connected to the two pairs of fan gears, and a mixer center shaft is connected to the pair of fan gears of the auxiliary commutator gear housing.

Furthermore, a sixth sealing member is provided between the mixing container cover and the mixing container, a first sealing member is provided between the fixed container and the driving cover, a slewing support bearing and a first sealing ring are provided between the driving cover and the mixing container cover, a second sealing ring is provided between the main commutator gear housing and the mixing container cover, a fourth sealing member is provided between the main commutator gear housing and the hollow driving shaft, and a third sealing member is provided between the auxiliary commutator gear housing and the mixer center shaft.

Compared with the existing arts, the advantageous effects of the present invention are as follows:

According to the present invention, the driving cover and the mixing container cover has an integral structure (one-piece structure). The driving cover is configured to be driven to close or open the fixed container, and the mixing container cover is configured to be driven to close or open the mixing container, thereby achieving synchronization of sealing or separation task.

According to the present invention, after the mixing container is closed by the mixing container cover, the mixing container and the mixing container cover are driven to rotate synchronously. At this point, the mixing container and the mixing container cover are relatively stationary to each other, thus realizing integral rotation without differential speed, and the sealing requirement needed for mixing under closed working environment is converted from a friction dynamic seal to a static seal.

The discharge and sealing mechanism is arranged internally, therefore realizes the complete discharge under a closed internal environment for complete mixing and complete discharge, ensuring that the path outside the material outlet does not require the setting of tools, making cleaning quick, convenient and efficient.

The numerical references are as follows: 1. driving cover; 2. mixing container cover; 3. mixing container; 4. fixed container; 5. discharging piston; 6. linear motion mechanism; 7. base; 8. linear driving mechanism; 9. hollow shaft reduction motor; 10. first sealing member; 11. hollow slewing bearing; 12. reduction motor; 13. scraper; 14. mixing rotor; 15. main commutator gear housing; 16. auxiliary commutator gear housing; 17. mixer center shaft; 18. hollow driving shaft; 19. slewing support bearing; 20. inner gear ring; 21. first sealing ring; 22. second sealing ring; 23. horizontal driving arm; 24. supporting connecting member; 25. gear; 26. material outlet flange; 27. driving rod; 28, discharge piston slewing bearing; 29. second sealing member; 30. linear driving mechanism support frame; 31. position guiding ring; 32. third sealing member; 33. fourth sealing member; 34. fifth sealing member; 35. sixth sealing member.

DETAILED DESCRIPTION OF THE PREFERRED EMBODIMENT

In order to explain further the technical problems, the technical solutions and the advantageous effects of the present invention, the present invention is further described in details below with reference to the drawings and embodiments. It should be understood that the specific embodiments described here are only used to explain the present invention and are not intended to be limiting.

Unless otherwise specified, the terms used have the common meanings understood by those skilled in the art.

At present, the existing rotary mixers or mixing devices have a container cover that does not need to rotate together with the mixer, and a sealing element is arranged between the mixer and the cover while relative rotation is achieved through friction. The sealing is poor and it is difficult to ensure the reliability of the work. In some special working environments, such as the mixing of new energy battery materials, the mixer is too large, and there are no suitable large-diameter seals or standard seals on the market. It is difficult to ensure sealing under high-speed rotation conditions, making it impossible for the materials to be fully mixed in a closed environment to provide a mixture that meets the process requirements for the subsequent process stages.

Accordingly, the present invention provides a mixer with rotating container, which includes:
- a fixed container 4, having a top opening and defining a receiving cavity;
- a mixing container 3 having a top opening and defining a mixing cavity, received inside the fixed container 4, rotatably connected to the fixed container 4 and having a material outlet 260 at a bottom portion of the mixing container;
- a discharge and sealing mechanism, which comprises a piston 5 arranged to open or close the material outlet 260;
- a driving cover 1 configured to be driven to open or close the top opening of the fixed container 4;
- a mixing container cover 2 coaxially arranged with the driving cover 1 and to rotate relatively to the driving cover 1, forming an integral body with the driving cover 1, wherein the mixing container cover 2 is configured to be driven to open or close the top opening of the mixing container 3 and to be driven to rotate synchronously with the mixing container 3 after the mixing container 3 is covered by the mixing container cover 2;

the piston 5 is arranged inside the mixing container 3, and is arranged coaxially with the driving cover 1 to form an integral body, wherein the piston 5 is configured to be driven to move linearly relative to the driving cover 1, after the piston 5 closes the material outlet 260, the piston 5 is configured to rotate synchronously with the mixing container 3 when the mixing container 3 is driven to having rotational movement.

According to this embodiment, the driving cover 1 and the mixing container cover 2 form a one-piece structure, the driving cover 1 configured to be driven to open or close the top opening of the fixed container 4 and the mixing container cover 2 is configured to be driven to open or close the top opening of the mixing container 3, thereby realizing synchronization of sealing or separation task.

After the mixing container 3 is covered by the mixing container cover 2, the mixing container cover 2 and the mixing container 3 are driven to rotate synchronously. At this moment, the mixing container 3 and the mixing container cover 2 are relatively stationary to each other, thus realizing integral rotation without differential speed.

In order to realize the integral rotation of the mixing container 3 and the mixing container cover 2 after being in a closed position, a groove may be optionally arranged on a closing edge of the mixing container 3, and an outward convex ridge may be arranged on a closing surface of the mixing container cover 2. The closing edge and the closing surface are fittingly matched to each other such that the convex ridge is embedded inside the groove when the mixing container 3 and the mixing container cover 2 are in the closed position. Through the inlaid setting, the mixing container 3 and the mixing container cover 2 are positioned as a one-piece structure and can be driven to rotate synchronously. For example, the mixing container 3 is driven so that both the mixing container 3 and the mixing container cover 2 can rotate synchronously.

Similarly, a groove may be optionally arranged on a closing edge of the fixed container 4, and an outward convex ridge may be arranged on a closing surface of the driving cover 1. The closing edge and the closing surface are fittingly matched to each other such that the convex ridge is embedded inside the groove when the fixed container 4 and the driving cover 1 are in the closed position. Through the inlaid setting, the fixed container 4 and the driving cover 1 are positioned as a one-piece structure. Since the fixed container 4 does not have any rotational movement, the driving cover 1 also does not have any rotational movement.

Accordingly, the convex ridge and the groove may be a rigid sealing fit, and may be made into, including but not limited to, a ring-shaped, a wedge-shaped or a hemispherical-shaped for matching with each other so as to realize an integral rotation with a relatively static state; or a filling sealing ring may be used to achieve positioning, sealing and integral rotation with relatively static state.

Figure 1:
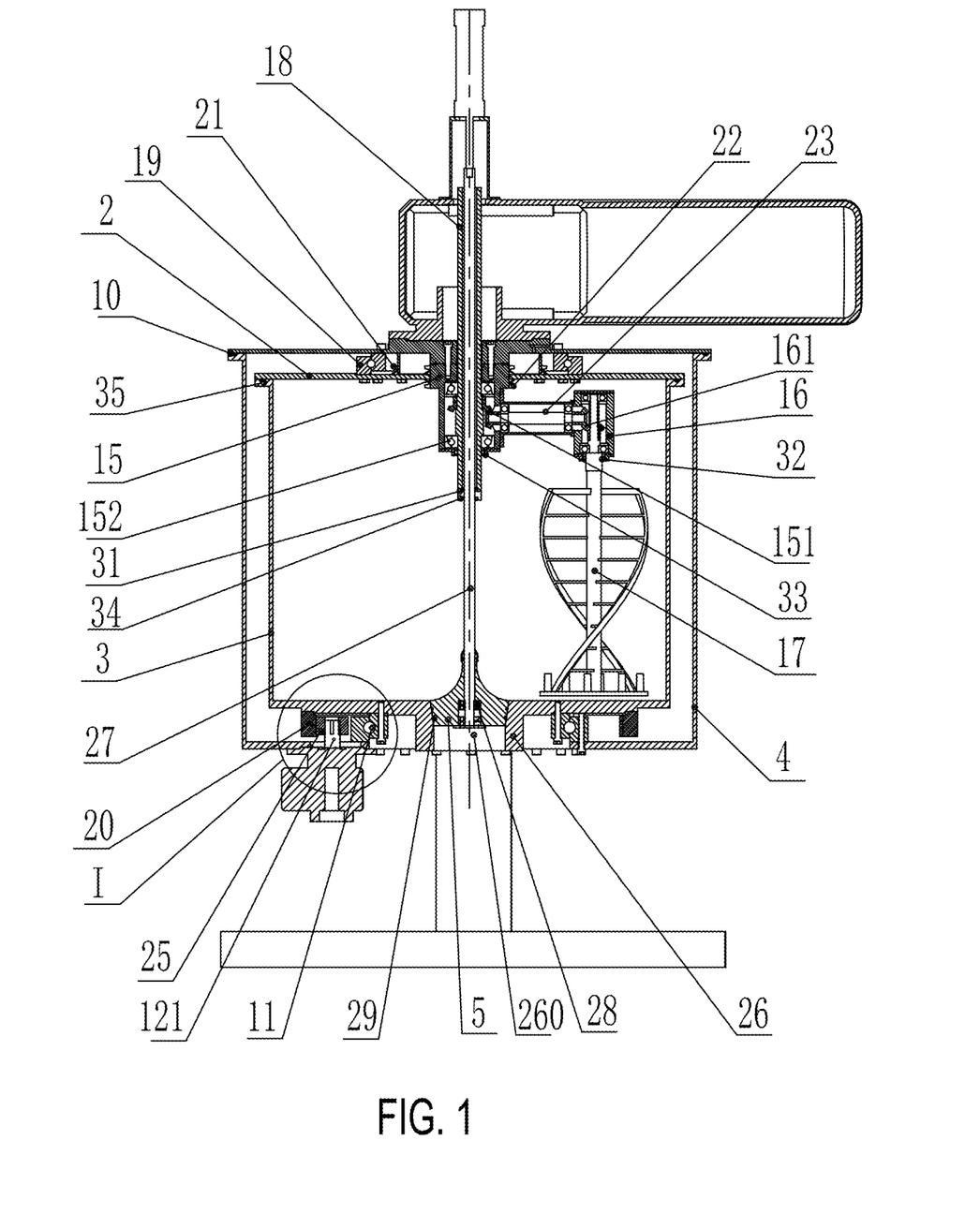
FIG. 1 is a cross-sectional view of a mixing device with rotatable container showing the driving cover and the fixed container in a closed state, and the mixing container cover and the mixing container in a closed state, according to a preferred embodiment of the present invention.

FIG. 1 shows a schematic diagram of a mixing device with rotatable container in a closed state of some preferred embodiments. In the figure, the driving cover 1 and the mixing container cover 2 are configured to be in a synchronously closed state, that is, the fixed container 4 is closed with the driving cover 1 under the closed state, and the mixing container 3 is closed with the mixing container cover 2 under the closed state.

Figure 3:
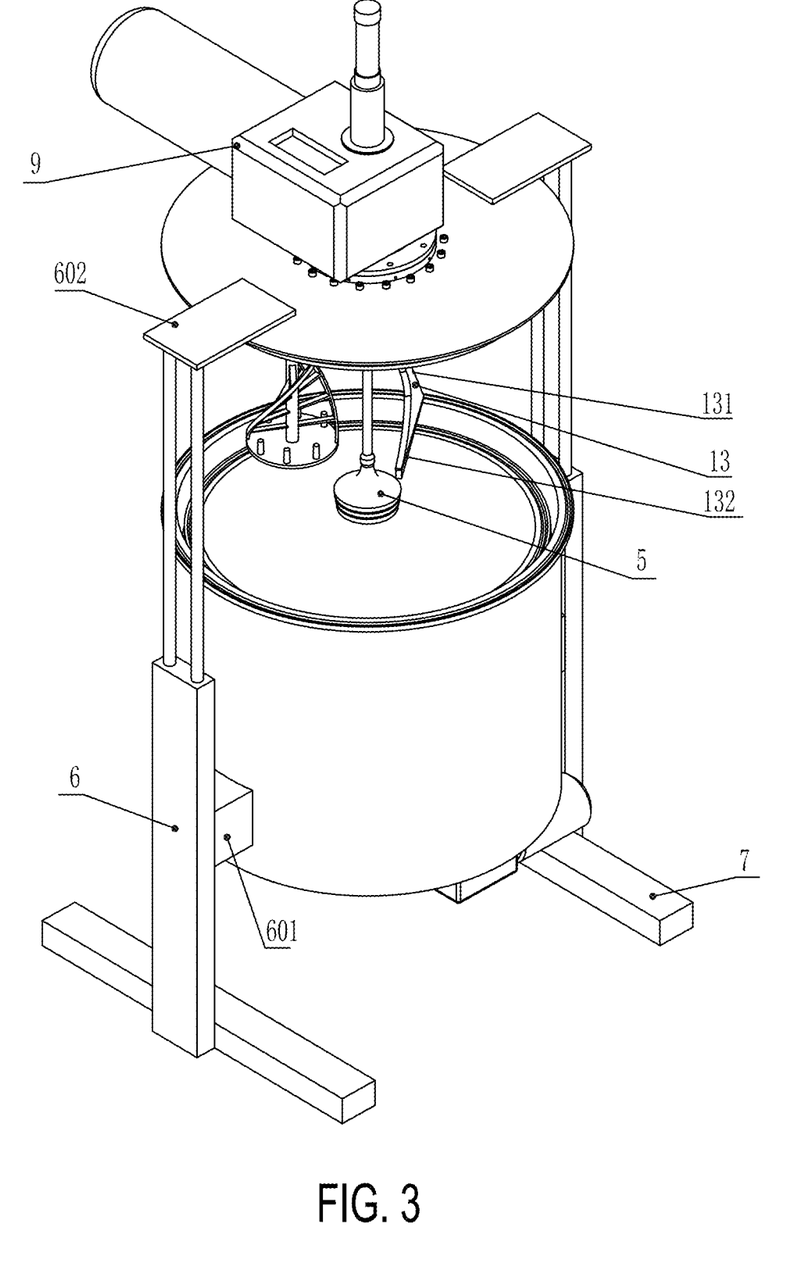
FIG. 3 is an axonometric view of a mixing device with rotatable container showing the driving cover and the fixed container in a separate (open) state, and the mixing container cover and the mixing container in a separate (open) state, according to a preferred embodiment of the present invention.
Figure 4:
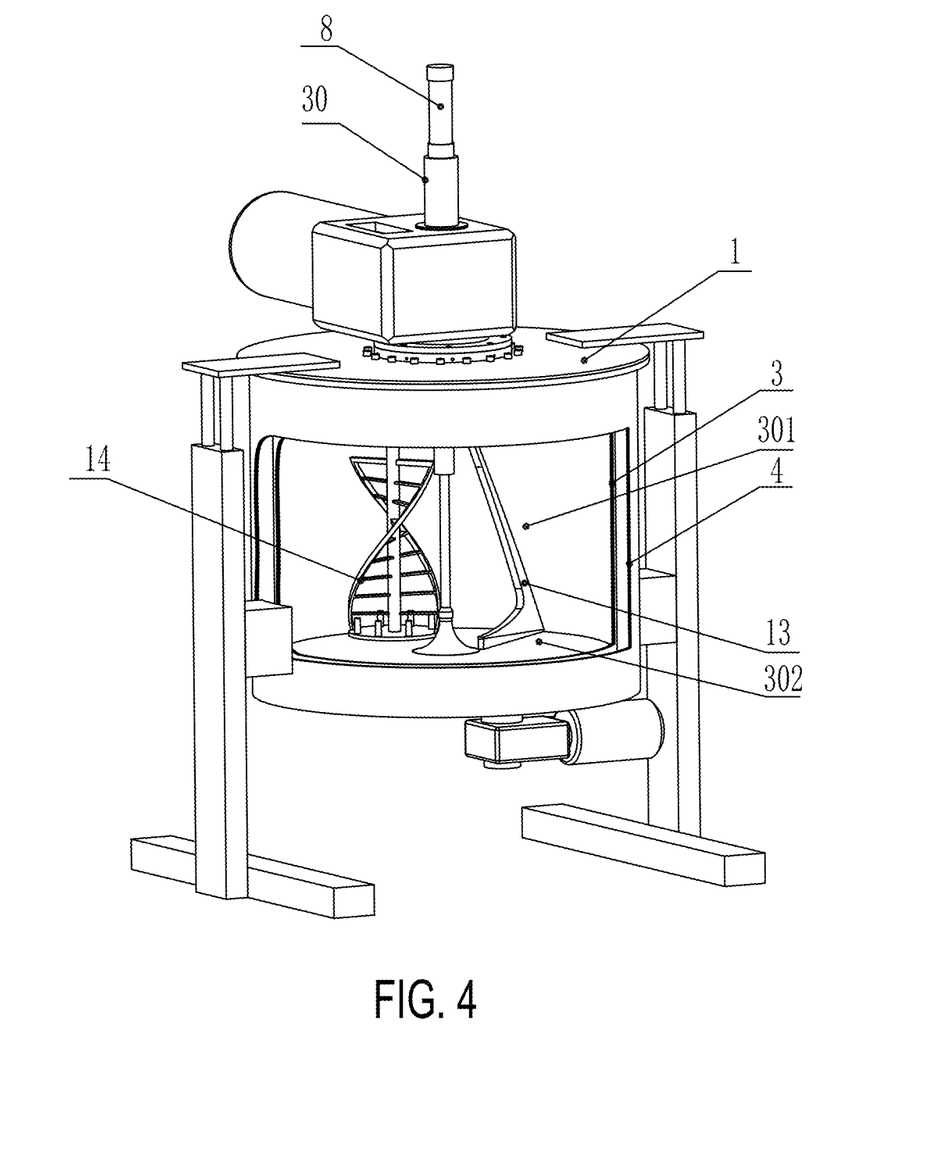
FIG. 4 is an axonometric view of a mixing device with rotatable container, showing the driving cover and the fixed container in a closed state, and the mixing container cover and the mixing container in a closed state, according to a preferred embodiment of the present invention.

FIG. 3 shows a schematic diagram of a mixing device with rotatable container in an open state of some preferred embodiments. In the figure, the driving cover 1 and the mixing container cover 2 are configured to be in a synchronously open state, that is, the fixed container 4 and the driving cover 1 are separated under the open state, and the mixing container 3 and the mixing container cover 2 are separated under the open state.

In addition, the existing rotary mixer or mixing device discharges materials by providing a discharge tool outside the mixer, and the discharge tool is arranged on the discharge path. This method is difficult to achieve cleaning or washing requirements.

According to some embodiments of the present invention, the mixing device with rotatable container is designed with a discharge and sealing mechanism, which comprises a piston 5. The piston 5 is disposed inside the mixing container 3, arranged coaxially with the driving cover 1 and formed an integral structure as a whole. The piston 5 is configured to be driven to move linearly relative to the driving cover 1 to realize the opening and closing of the material outlet 260 from the inside. After the piston 5 closes the material outlet 260, the piston 5 is configured to rotate synchronously with the mixing container 3 when the mixing container 3 is driven to having rotational movement. Therefore the rotational movement of the mixing container 3 is realized.

Through the internal discharge in a closed environment, the material is enclosed inside the inner cavity to complete mixing and to discharge completely, ensuring that the path outside the material outlet does not require any tool arrangement, making cleaning quick and convenient, and making cleaning efficient.

For the convenience of description, referring to FIG. 1 to FIG. 6 of the drawings, the mixing device with rotatable container according to some embodiments of the present invention comprises: a driving cover 1, a mixing container cover 2, a mixing container 3 and a fixed container 4.

The fixed container 4 has a top opening and defining a receiving cavity.

The mixing container 3 has a top opening defining a mixing cavity therein, and is received inside the fixed container 4. Between an outer bottom side of the mixing container 3 and an inner bottom side of the fixed container 4, a hollow slewing bearing 11 is arranged. The relative rotational movement between the mixing container 3 and the fixed container 4 is realized through the hollow slewing bearing 11. The mixing container 3 has a material outlet 260 at a bottom portion thereof.

The driving cover 1 is controlled by a linear motion mechanism 6, which comprises a fixed part 601 and a moveable part 602, open or close the top opening of the fixed container 4. The fixed container 4 is installed on the fixed part 601 of the linear motion mechanism 6 and the driving cover 1 is installed on the moveable part 602 of the linear motion mechanism 6.

The mixing container cover 2 is coaxially arranged with the driving cover 1. Through a slewing support bearing 19 arranged between the driving cover 1 and the mixing container cover 2, a relative rotational movement is achieved and an integral body is formed. In order to ensure the airtightness of the mixing device with rotatable container during operation, a first sealing ring 21 is provided between the driving cover 1 and the mixing container cover 2.

According to an exemplary embodiment, the driving cover 1 and the rotating mixing container cover 2, which is connected to the slewing support bearing 19, are sealed by the first sealing ring 21.

The mixing container cover 2 is configured to be driven to open or close the top opening of the mixing container 3; and to rotate synchronously with the mixing container 3 after the mixing container 3 is covered by the mixing container cover 2 in a closed state. The driving cover 1 is driven by the linear motion mechanism 6 to simultaneously perform up and down vertical linear motion so that the mixing container cover 2 and the mixing container 3 can be separated from each other or rotated synchronously with each other after being fittingly connected together under the action of the driving cover 1, thereby meeting the airtightness of the mixing device with rotatable container during operation.

According to an exemplary embodiment, the linear motion mechanism 6 can be an actuator such as a pneumatic actuator (such as a cylinder), a hydraulic actuator (a servo hydraulic cylinder), an electric push rod, a linear motor or a ball screw pair.

Preferably, the linear motion mechanism 6 is a dual-rod cylinder.

According to an exemplary embodiment, the linear motion mechanism 6 is symmetrically mounted on a base 7, wherein the fixed part 601 of the linear motion mechanism 6 is connected to the base 7, and the movable part 602 is connected to the driving cover 1, so as to realize the up and down linear motion of the driving cover 1. When the linear motion mechanism 6 performs an upward movement, all the parts connected to the driving cover 1 and the mixing container cover 2 with the connected slewing support bearing 19 can be simultaneously separated from the mixing container 3 and exposed to define an exposed state. When the linear motion mechanism 6 performs an downward movement, all the parts connected to the driving cover 1 and the mixing container cover 2 with the connected slewing support bearing 19 can be simultaneously pressed into the mixing container 3. After pressing in, it is necessary to ensure that the mixing container cover 2 and the mixing container 3 are tightly fitted, and at the same time, the driving cover 1 and the upper flange of the fixed container 4 are tightly sealed to achieve mixing work in a closed state.

According to this exemplary embodiment, a sixth sealing member 35 is provided between the mixing container cover 2 and the mixing container 3, and the mixing container cover 2 and the mixing container 3 are sealed by the sixth sealing member 35. A first sealing member 10 is provided between the fixed container 4 and the driving cover 1, and the fixed container 4 and the driving cover 1 are sealed by the first sealing member 10.

Preferably and optionally, the sixth sealing member 35 and the first sealing member 10 are both sealing rings so as to ensure the airtightness of the mixing device with rotatable container during operation.

The discharge and sealing mechanism is arranged inside the mixing container 3, and is arranged coaxially with the driving cover 1 to form an integral body. The discharge and sealing mechanism is configured to be driven to close or open the material outlet 260.

In some embodiments, referring to FIG. 1 and FIG. 3 of the drawings, the discharge and sealing mechanism further comprises a linear drive mechanism 8, a driving rod 27, a second sealing member 29 and a fifth sealing member 34. The driving rod 27 is sleeved inside a hollow driving shaft 18, and the driving rod 27 is controlled by the linear driving mechanism 8 installed on the driving cover 1 to realize linear movement, the fifth sealing member 34 is arranged between the driving rod 27 and the hollow driving shaft 18, the hollow driving shaft 18 is provided on the driving cover 1 and the mixing container cover 2, the piston 3 is provided inside the mixing container 3 and mounted at a lower end of the driving rod 27, the piston 5 is capable of having rotational movement relative to the driving rod 27, and the second sealing member 29 is provided between an outer side of the piston 5 and a side surface of the material outlet 260.

Preferably and optionally, the second sealing member 29 and the fifth sealing member 34 are sealing rings to ensure the airtightness of the mixing device with rotatable container during operation.

According to another exemplary embodiment, one end of the moving end of the linear driving mechanism 8 is connected to an upper end of the driving rod 27 installed inside the hollow driving shaft 18 by a hinge mechanism. The piston 5 is installed at the lower end of the driving rod 27. The position guiding ring 31 installed in the hollow driving shaft 18 guides and controls the driving rod 27 to drive the piston 5 to move up and down without swinging.

Preferably and optionally, the linear driving mechanism 8 can be an actuator such as a pneumatic actuator (such as a cylinder), a hydraulic actuator (a servo hydraulic cylinder), an electric push rod, a linear motor or a ball screw pair, for playing the role of pulling and pressing the driving rod 27.

Preferably, the linear driving mechanism 8 is a cylinder.

According to another exemplary embodiment, a material outlet flange 26 is arranged at a bottom center of the mixing container 3, and the center of the material outlet flange 26 has an inverted cone shape, the up and down movement of the piston 5 having a matching size with the material outlet flange 26 under the driving force of the driving rod 27 connected is realized, therefore the piston 5 and the material outlet flange 26 are sealed and separated at the inclined surface of the material outlet flange 26 to complete the sealing function of the mixing device with rotatable container during working and the discharging function when discharging. A discharge piston slewing bearing 28 is installed at the center position of the piston 5 and is connected to the driving rod 27 to achieve synchronous rotation when the mixing container 3 rotates and the piston 5 and the material outlet flange 26 are in close contact and sealed. The outer conical surface of the piston 5 and the inner inverted conical surface of the center hole of the material outlet flange 26 are sealed with a second sealing member 29.

Preferably, the second sealing member 29 is a sealing ring.

Figure 5:
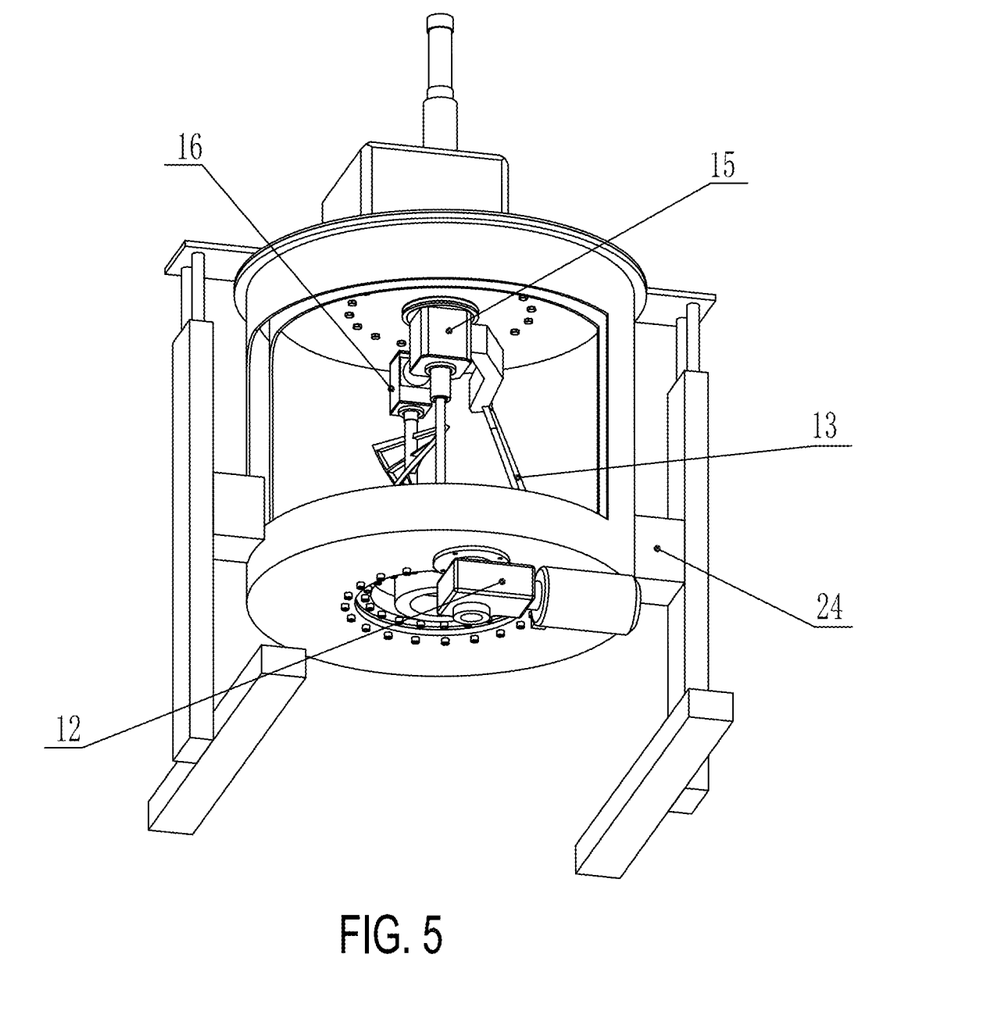
FIG. 5 is a schematic diagram of the arrangement of the power mechanism and the scraper according to a preferred embodiment of the present invention.

In some embodiments, referring to FIG. 1 and FIG. 5 of the drawings, the rotation of the mixing container 3 relative to the fixed container 4 is controlled by a power mechanism, which includes a reduction motor 12, an inner gear ring 20 and a gear 25. The inner gear ring 20 is installed on an outer bottom surface of the mixing container 3. The reduction motor 12 is installed on an outer bottom surface of the fixed container 4. The gear 25 is installed on an output shaft 121 of the reduction motor 12, and the gear 25 is meshed with the inner gear ring 20.

The fixed container 4 is connected and fixed to the fixed part 601 of the linear motion mechanism 6 on two sides through supporting connectors 24 on two sides. The upper side of the bottom plate of the fixed container 4 is fixedly connected to the bearing outer sleeve of the hollow slewing bearing 11, and an inner sleeve of the hollow slewing bearing 11 is fixedly connected to the outer bottom surface of the mixing container 3. An inner gear ring 20 is fixedly installed on the lower side of the bottom of the mixing container 3 by bolts, and the lower surface of the bottom plate of the fixed container 4 is fixedly connected to the reduction motor 12 by bolts, thereby realizing the coaxial rotational movement of the mixing container 3 relative to the fixed container 4 under the driving force of the reduction motor 12.

Figure 6:
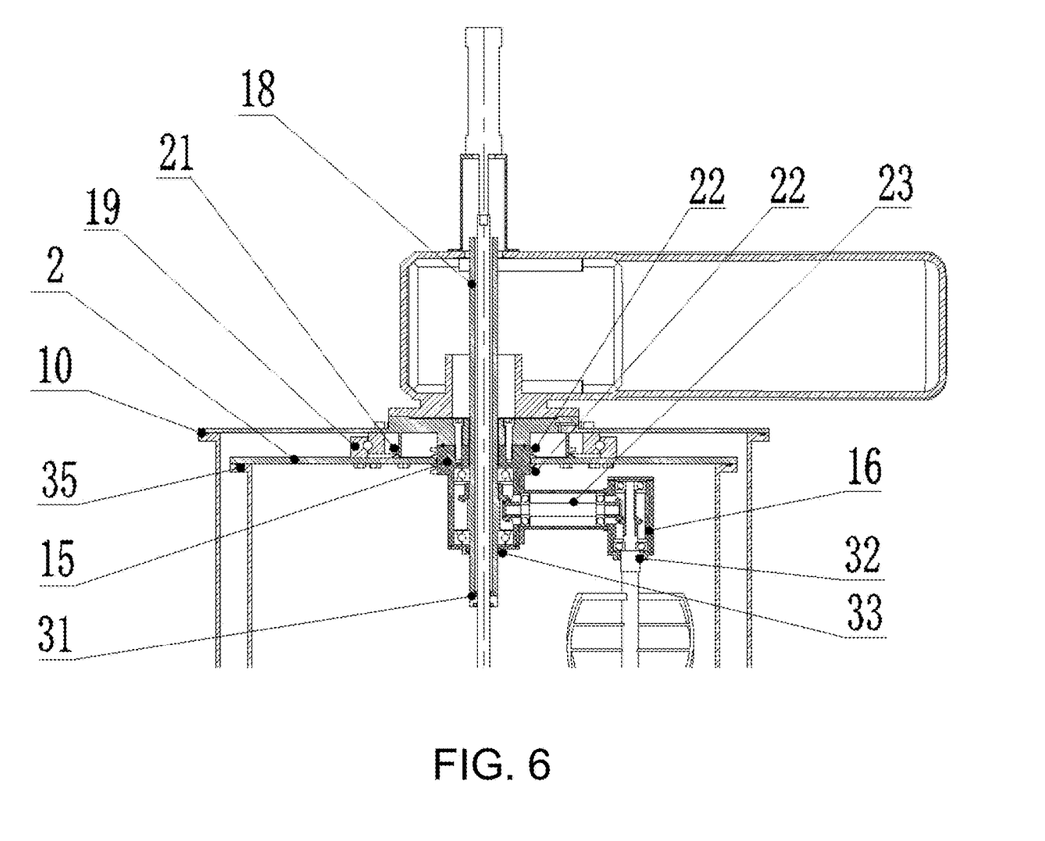
FIG. 6 is a schematic diagram showing the connection of main commutator gear housing and auxiliary commutator gear housing according to a preferred embodiment of the present invention.

In some embodiments, referring to FIG. 6 of the drawings, a hollow shaft reduction motor 9 is installed on the driving cover 1, and a hollow driving shaft 18 is installed inside the hollow shaft reduction motor 9. A main commutator gear housing 15 in sealed contact with the mixing container cover 2 is installed at a lower end of the driving cover 1. The hollow driving shaft 18 is arranged on the driving cover 1 and the main commutator gear housing 15, and can rotate relative to the driving cover 1 and the main commutator gear housing 15. The main commutator gear housing 15 is connected to the auxiliary commutator gear housing 16 through a horizontal driving arm 23. The auxiliary commutator gear housing 16 is installed with a mixer center shaft 17, and the mixing rotor 14 is installed on the mixer center shaft 17.

According to another exemplary embodiment, a hollow shaft reduction motor 9 is installed on the upper part of the driving cover 1, and a hollow driving shaft 18 is installed inside the hollow shaft reduction motor 9. The lower part of the driving cover 1 is fixedly connected to the top of the main commutator gear housing 15 by bolts, and the side of the main commutator gear housing 15 is connected to the side of the auxiliary commutator gear housing 16 by a horizontal driving arm 23. The auxiliary commutator gear housing 16 is installed with a mixer center shaft 17, thereby driving the mixing rotor 14 to rotational movement. A linear driving mechanism support frame 30 is installed on the top of the hollow shaft reduction motor 9 and is fixedly connected to the linear driving mechanism 8 by bolts.

Figure 2:
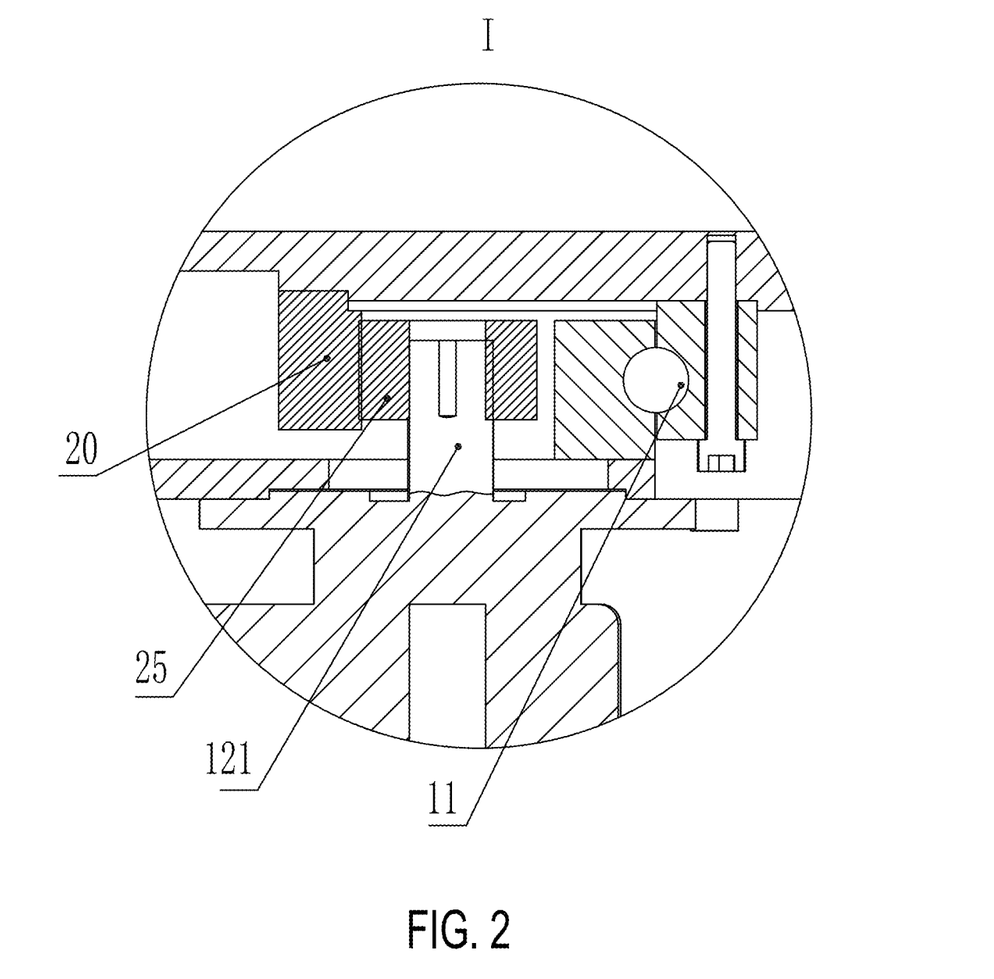
FIG. 2 is an enlarged view of I in FIG. 1.

Furthermore, in order to ensure the airtightness of the mixing device with rotatable container during operation, as shown in FIG. 1 and FIG. 2 of the drawings, a second sealing ring 22 is provided between the main commutator gear housing 15 and the mixing container cover 2, a fourth sealing member 33 is provided between the main commutator gear housing 15 and the hollow driving shaft 18, and a third sealing member 32 is provided between the auxiliary commutator gear housing 16 and the mixer center shaft 17.

Preferably, the third sealing member 32 and the fourth sealing member 33 are sealing rings.

Furthermore, the main commutator gear housing 15 secure the hollow driving shaft 18 into position by bearings 152 inside the top and the bottom of the housing 15. The main commutator gear housing 15 is provided with a pair of fan gears 151 connected vertically at 90 degrees and mounted to the hollow driving shaft 18. The auxiliary commutator gear housing 16 is provided with a pair of fan gears connected vertically at 90 degrees. The two ends of the horizontal driving arm 23 are respectively connected to the two pairs of fan gears, and the mixer center shaft 17 is connected to the fan gears of the auxiliary commutator gear housing 16. The upper part of the hollow driving shaft 18 is fixed by the hole inside the hollow shaft reduction motor 9 and its driving force is transmitted to the hollow driving shaft 18. The main commutator gear housing 15 is installed at the lower center of the driving cover 1, and bearings are installed at the upper and lower parts respectively inside the main commutator gear housing 15 to secure the position of the hollow driving shaft 18. Inside the housing of the main commutator gear housing 15, a pair of fan gears 151 connected vertically at 90 degrees are used to transmit horizontal power to the auxiliary commutator gear housing 16. Inside the auxiliary commutator gear housing 16, a pair of fan gears 161 connected vertically at 90 degrees are used to transmit vertical power output. The auxiliary commutator gear housing 16 drives the mixer center shaft 17 to drive the mixing rotor 14 to rotate.

In some embodiments, a scraper 13 is installed on the main commutator gear housing 15. The scraper 13 is gap-fit with the side wall 301 and bottom side 302 of the mixing container 3 at the same time, thereby realizing a relative scraping action. The vertical outer edge 131 of the scraper 13 forms a non-contact clearance fit with the side wall 301 of the mixing container 3, the outer edge of the bottom edge 132 of the scraper 13 forms a non-contact clearance fit with the bottom 302 of the mixing container 3, and the scraper 13 is set at a distance from the mixing rotor 14. A certain distance is maintained between the scraper 13 and the mixing rotor 14 to ensure that the mixing rotor 14 and the scraper 13 do not interfere with each other, so as to achieve the best dispersion and kneading action on the powder materials. The hollow driving shaft 18 has the function of driving the mixing rotor 14 and opening the cover to realize both the functions of opening the cover and discharging. The materials extend to a certain distance from the outer edge of the bottom side of the scraper 13 to the material outlet 260, and the materials are guided to the material outlet 260 under the guidance of the scraper 13 to realize complete discharge of materials.

The present invention have been shown and described above. Those skilled in the art should understand that the present invention is not limited by the above embodiments. The above embodiments and descriptions only illustrate the principles of the present invention. Without departing from the spirit and scope of the present invention, there will be various changes and improvements in the present invention, and these changes and improvements will all fall within the scope of the claimed invention. The scope of protection of the present invention is defined by the appended claims and their equivalents.

What is claimed is:

1. A mixing device with rotatable container, which comprises
   a fixed container (4), having a top opening and defining a receiving cavity;
   a mixing container (3) having a top opening and defining a mixing cavity, received inside said fixed container (4), rotatably connected to said fixed container (4) and having a material outlet (260) at a bottom of said mixing container (3),
   a discharge and sealing mechanism, which comprises a piston (5) arranged inside said mixing container (3) for opening and closing said material outlet (260);
   characterized in that, said mixing device with rotatable container further comprising:
   a driving cover (1) configured to be driven to open or close said top opening of said fixed container (4), and arranged coaxially with said piston (5) to form an integral body;
   a linear motion mechanism (6) which comprises a fixed part (601) and a moveable part (602), control said driving cover (1) being driven to open or close said fixed container (4), wherein said fixed container (4) is installed on said fixed part (601) of said linear motion mechanism (6) and said driving cover (1) is installed on said moveable part (602) of said linear motion mechanism (6);
   a mixing container cover (2) coaxially arranged with said driving cover (1) and arranged to rotate relative to said driving cover (1), forming an integral body with said driving cover (1), wherein said mixing container cover (2) is configured to be driven to open or close said top opening of said mixing container (3) and to rotate synchronously with said mixing container (3) after said mixing container (3) is covered by said mixing container cover (2);

a hollow driving shaft (18) installed inside said hollow shaft reduction motor (9);

a main commutator gear housing (15) mounted below said driving cover (1) and in sealed contact with said mixing container cover (2); wherein said hollow driving shaft (18) is arranged on said driving cover (1) and said main commutator gear housing (15) and is capable of having rotational movement relative to said driving cover (1) and said main commutator gear housing (15);

an auxiliary commutator gear housing (16) connected to said main commutator gear housing (15) through a horizontal drive arm (23);

a mixer center shaft (17) installed on said auxiliary commutator gear housing (16);

a mixing rotor (14) mounted on said mixer center shaft (17), a scraper (13) mounted on said main commutator gear housing (15), wherein said scraper (13) is clearance fit with both a side wall and a bottom of said mixing container (3) at the same time, a vertical outer edge of said scraper (13) forms a non-contact clearance fit with a side wall of said mixing container (3), an outer edge of said bottom side of said scraper (13) is clearance fit with an upper plane of said bottom of said mixing container (3), and said scraper (13) is spaced apart from said mixing rotor (14);

said discharge and sealing mechanism further comprising a driving rod (27) and a fifth sealing member (34); wherein said driving rod (27) is sleeved inside said hollow driving shaft (18) and is controlled by a linear driving mechanism (8) installed on said driving cover (1) to realize linear movement, said fifth sealing member (34) is arranged between said driving rod (27) and said hollow driving shaft (18), said hollow driving shaft (18) is provided on said driving cover (1) and said mixing container cover (2), said piston (5) is mounted at a lower end of said driving rod (27), said piston (5) is capable of having rotational movement relative to said driving rod (27), and said piston (5) is configured to be driven to linear movement relative to said driving cover (1) to realize the closing or opening of said material outlet (260) from the inside, after said piston (5) closes said material outlet (260), said piston (5) is configured to rotate synchronously with said mixing container (3) when said mixing container (3) is driven to having rotational movement.

2. The mixing device with rotatable container according to claim 1, characterized in that, further comprising a slewing support bearing (19) arranged between said driving cover (1) and said mixing container cover (2).

3. The mixing device with rotatable container according to claim 1, characterized in that, further comprising a hollow slewing bearing (11) arranged between an outer bottom side of said mixing container (3) and an inner bottom side of said fixed container (4).

4. The mixing device with rotatable container according to claim 1, characterized in that, further comprising a power mechanism to control a rotational movement of said mixing container (3) relative to said fixed container (4), wherein said power mechanism comprises a reduction motor (12) mounted on an outer bottom side of said fixed container (4), an inner gear ring (20) mounted on an outer bottom side of said mixing container (3) and a gear (25) mounted on an output shaft of said reduction motor (12) and meshed with said inner gear ring (20).

5. The mixing device with rotatable container according to claim 1, characterized in that, a second sealing member (29) is provided between an outer side surface of said piston (5) and a material outlet side surface of said material outlet (260).

6. The mixing device with rotatable container according to claim 1, characterized in that, said hollow driving shaft (18) is fixed in upper and lower sides of said main commutator gear housing (15) through bearing (152), a pair of fan gears is arranged inside said main commutator gear housing (15), and mounted to said hollow drive shaft (18) and connected vertically at 90 degrees; another pair of fan gears are connected vertically at 90 degrees arranged inside said auxiliary commutator gear housing (16); a horizontal driving arm (23) having two ends are respectively connected to said two pairs of fan gears, and a mixer center shaft (17) is connected to said pair of fan gears of said auxiliary commutator gear housing (16).

7. The mixing device with rotatable container according to claim 1, characterized in that, further comprising: a sixth sealing member (35) provided between said mixing container cover (2) and said mixing container (3), a first sealing member (10) provided between said fixed container (4) and said driving cover (1), a slewing support bearing (19) and a first sealing ring (21) are provided between said driving cover (1) and said mixing container cover (2), a second sealing ring (22) provided between said main commutator gear housing (15) and said mixing container cover (2), a fourth sealing member (33) provided between said main commutator gear housing (15) and said hollow driving shaft (18), and a third sealing member (32) provided between said auxiliary commutator gear housing (16) and said mixer center shaft (17).

* * * * *